United States Patent [19]

Hirashima

[11] 3,922,715

[45] Nov. 25, 1975

[54] RECORDING AND REPRODUCING APPARATUS FOR VIDEO SIGNALS USING A VIDEO STORAGE TUBE AND AN AUDIO TAPE RECORDING DEVICE

[75] Inventor: Masayoshi Hirashima, Ibaragi, Japan

[73] Assignee: Matsushita Electric Industrial Co., Ltd., Japan

[22] Filed: May 10, 1973

[21] Appl. No.: 358,964

[30] Foreign Application Priority Data

May 11, 1972 Japan .............................. 47-46944
May 16, 1972 Japan .............................. 47-48747
May 16, 1972 Japan .............................. 47-48763

[52] U.S. Cl. ......................... 360/9; 360/19; 360/35

[51] Int. Cl.² ........................................ H04N 5/78

[58] Field of Search .......... 360/8, 9, 10, 19, 33, 35; 178/DIG. 3, DIG. 35, DIG. 24, 6.8, 6.6 FS; 174/15.55 R

[56] References Cited

UNITED STATES PATENTS

| | | | |
|---|---|---|---|
| 2,907,819 | 10/1959 | Perilhou | 360/33 |
| 3,061,670 | 10/1962 | Oster et al. | 178/6.8 |
| 3,085,130 | 4/1963 | Lemelson | 178/DIG. 35 |

*Primary Examiner*—Raymond F. Cardillo, Jr.
*Attorney, Agent, or Firm*—Burgess, Ryan and Wayne

[57] ABSTRACT

Apparatus for storing at least one field of television video signal on a broad band storage tube and reading out the stored video signal by low frequency scanning, the signal being recorded in a low frequency recording device. A sound signal is also recorded in the device. The video signal recorded in the low frequency recording device is again read out and stored in the storage tube; the stored video signal is again read out by high frequency scanning and displayed on a cathode ray tube. The recorded sound is reproduced intermittently or simultaneously with the reproduction of a video signal.

10 Claims, 30 Drawing Figures

RECORDING AND REPRODUCING APPARATUS FOR VIDEO SIGNALS USING A VIDEO STORAGE TUBE AND AN AUDIO TAPE RECORDING DEVICE

BACKGROUND OF THE INVENTION

An apparatus for recording a television video signal and a sound signal and reproducing them for and alternately use has already been developed; however such a device requires special techniques for operation and is high in price. It is desired to provide a simple low price apparatus which may be used with a simple device such as a conventional magnetic recording device for recording and reproducing of video and sound signals.

SUMMARY OF THE INVENTION

The object of the present invention is to provide a simple and low cost recording and reproducing apparatus for picture and sound signals.

According to the present invention, a video signal is stored in a broad band storage tube. The stored video signal is read out by means of low frequency scanning and this is recorded in a low frequency recording device with a sound signal. The recorded video signal is again read out at low speed and stored in the storage tube again, read out at high frequency scanning and displayed on a cathode ray tube as a static picture. The recorded sound is reproduced simultaneously or intermittently with the picture.

According to the present invention, video signals are recorded and reproduced at low speed; and the signal controlling speed of recording device is recorded with television signals on one recording medium.

Figure 1:
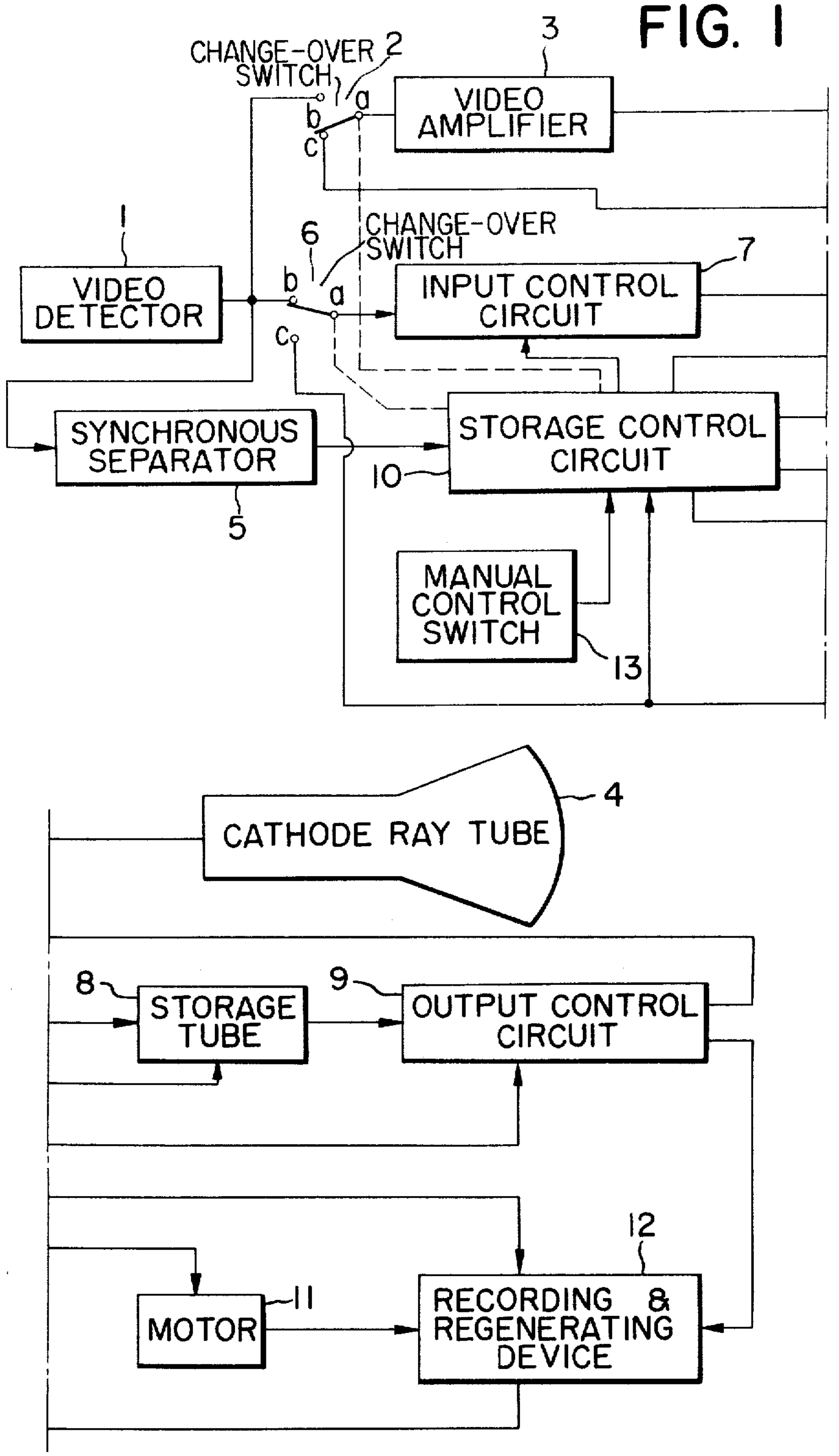
FIG. 1 shows a block diagram of a recording and reproducing apparatus for picture and sound signals according to the present invention.
Figure 2:
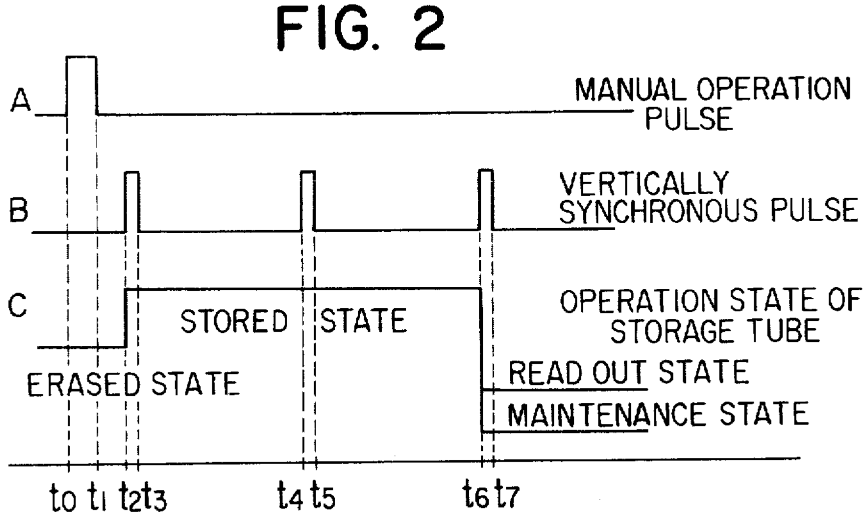
FIG. 2 shows waveforms for illustrating the operation of the present invention.

DESCRIPTION OF THE PREFERRED EMBODIMENTS:

Referring now to FIG. 1, numeral 1 indicates the video detector used in a known television receiver; numeral 2 indicates a change-over switch for selection of either the output of the video detector 1 or the output signal of a storage tube; numeral 3 indicates a video amplifier circuit; numeral 4 indicates a cathode-ray tube; numeral 5 indicates a synchronous separator circuit, these are substantially identical with the circuits of known television receivers except for the switch 2; numeral 6 indicates a change-over switch for selecting the output of either the video detector 1 and/or a recording and regenerating device 12; numeral 7 indicates an input control circuit for controlling the amplitude and phase of the input signal applied to the storage tube 8; numeral 8 indicates a storage tube whose storage element is, for example, a silicon oxide insulator being formed in the shape of mesh on a silicon target sealed in a vidicon in the place of a photoconductive film electrode. When manual control 13 is manually initiated at the time $t_0$, each electrode voltage of the storage tube 8 is in such a condition that it is ready to store an image, at the initial vertical synchronization signal $t_2$ $t_3$ of the output from the synchronous separator, the output from the input control circuit 7 is applied to the input terminal of the storage tube 8, and simultaneously, both the vertical and horizontal scanning begin. The scanning will stop when the image of one frame or one field is stored. The above operation is controlled by a storage control circuit 10. The storage control circuit 10 includes a deflection circuit and operates in synchronism with the vertical and horizontal synchronous signals from the synchronous separator circuit 5. When storage is completed, the electrode potentials of the storage tube 8 vary. The stored signal is read out, and adjusted to proper amplitude and phase by the output control circuit 9, supplied to the video amplifier 3 through the change-over switch 2, so that the image is reproduced on the screen of CRT 4. The storage control circuit 10 is so designed that the terminals *a* –*c* of the switch 2 are automatically closed. The terminals *a* –*c* of the change-over switch 6 remain closed until the *a* –*c* terminals of the change-over switch 2 close.

Now the method of reading out the contents of the storage by low scanning speed will be described. The storage control circuit 10 is controlled by the manual control switch 13, and the potentials of all electrodes of the storage tube are brought to a image readable value. In the FIG. 1,11 indicates a motor for a recorder and regenerator 12 for audio frequency recording and regeneration.

Now let's take a tape recorder, as an example, and assume the rate of horizontal scanning is 60 Hz. That is, the frequency of the vertical deflection of a known television receiver may be used. When the deflection is at 60 Hz, it requires 262.5 times the time as compared to the case where the deflection is performed at the rate of 15.75 KHz. When it is required to record a higher frequency range, it is possible to record up to 5.25 MHz at low speed e.g. 30 Hz (1 field). Some means is required so that such low speed scanning is performed accurately. Especially when it is reproduced, the wow and flutter of tape will become a difficult problem. Consequently, two tracks are used in which the video signal is recorded on channel A and a clock signal on channel B. Counting the number of scanning lines by means of the counter 14 shown in the FIG. 3, a clock pulse is produced every thirteenth line and recorded on the tape. The numer of pulses per second recommended is about 10 kHz. When the horizontal deflection is controlled by means of the vertical synchronous signal of a television receiver, the number of horizontal scanning lines contained in one field of television signal is 262.5 λ-9 = 253.5 lines because there are 9 lines in the vertical flyback time. If it is deflected horizontally at 60 Hz, counting the horizontal synchronous signal or the number of pulses synchronized with it, and if clock pulses are produced at every 13th line respectively, as 13 × 20 = 260, then 20 pulses will completely cover the horizontal scanning of single line in the storage tube. This will be described later. The letter C in the figure shows horizontal deflection waveform of the storage tube. The letters $H_1, H_2, H_3, \ldots H_{19}$ show the pulses produced at every thirteenth line of television-receiver horizontal scanning lines. Letters $V_0$ and $V_1$ show pulses having a pulse width equal to the flyback time width shown in FIG. 4 - C, being formed from the vertical sychronizing signal of television signal. In the tape, are recorded pulses $H_1, H_2, \ldots H_{19}$ as they are in shape and voltages $V_0$ and $V_1$ are in the shape of some cycles of a sine wave of 10 KHz.

Figures 3, 5:
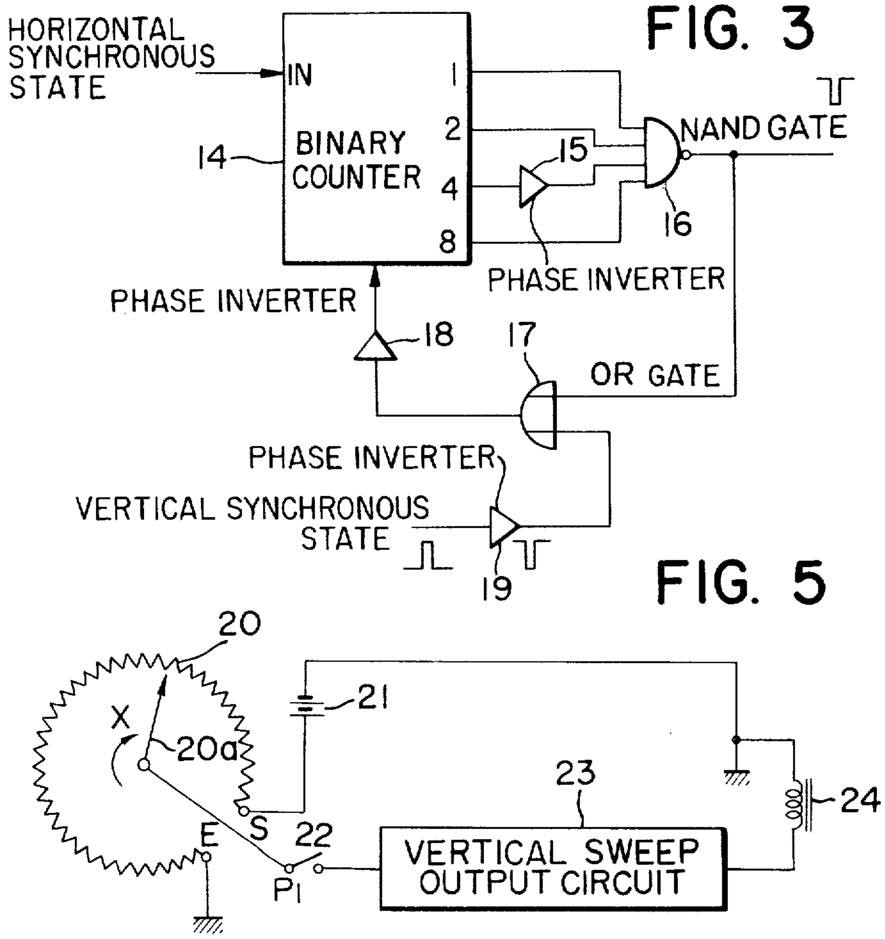
FIG. 3 shows a partial block diagram of the present invention.
FIG. 5 shows a circuit to be used in the apparatus of FIG. 1.
Figure 6:
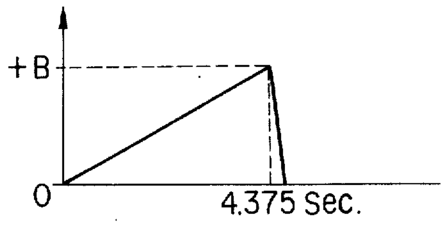
FIG. 6 shows waveforms for the circuit of FIG. 5.

In FIG. 3 is explained how thirteen horizontal synchronous signals are counted. The input is the horizontal synchronous signal in the television signal or pulse. When the thirteenth of the input signals come in, the output on four terminals of the counter 14 shows 1101 by the binary system, which is 13 in the decimal system. As the third unit from the left is 0, it is inverted by means of phase inverter 15 in that circuit, and four outputs are applied to four inputs NAND gate 16. The output of the NAND gate 16 becomes low level only when the output of the counter 14 is 1101, so that the number 13 can be detected. The output pulses may be used to obtain $H_1, H_2, \ldots$ and $H_{19}$ shown in the FIG. 4. The counter 14 is reset through OR gate 17 and phase inverter 18 after counting number 13 and after generating pulses by NAND gate 16; the counter starts counting the number again. Between times $t_{19}$ and $t_{20}$ vertical flyback time starts, e.g., after the completion of the equalizing pulse vettical pulse is applied onto a phase inverter 19; at this time $t_{20}$ the counter is reset, and the flyback time of saw-tooth wave shown in the FIG. 4 starts. For $V_0$ and $V_1$, the vertical synchronous signal of television signal may also be used as they are. As stated above, the video signal can be recorded on a magnetic tape along with the clock pulses. The tape driving motor 11 is, of course, controlled by means of the vertical synchronous signal or vertical pulse in the video signals. The second horizontal scanning on the storage tube is also identical with the above procedure and up to 262.5 lines. As to the vertical deflection of the storage tube 8, the clock pulse may be generated every thirteenth horizontal scan (one sixtieth of a second per single scanning) of the storage tube 8, which clock pulse may be utilized for controlling the revolution of the motor shown in the FIG. 5. The method is identical with that of FIG. 3. Scanning 262.5 lines at the rate of one sixtieth a second per one frame requires 4.375 seconds and the vertical sweeping wave form is as shown in FIG. 6.

Figure 4:
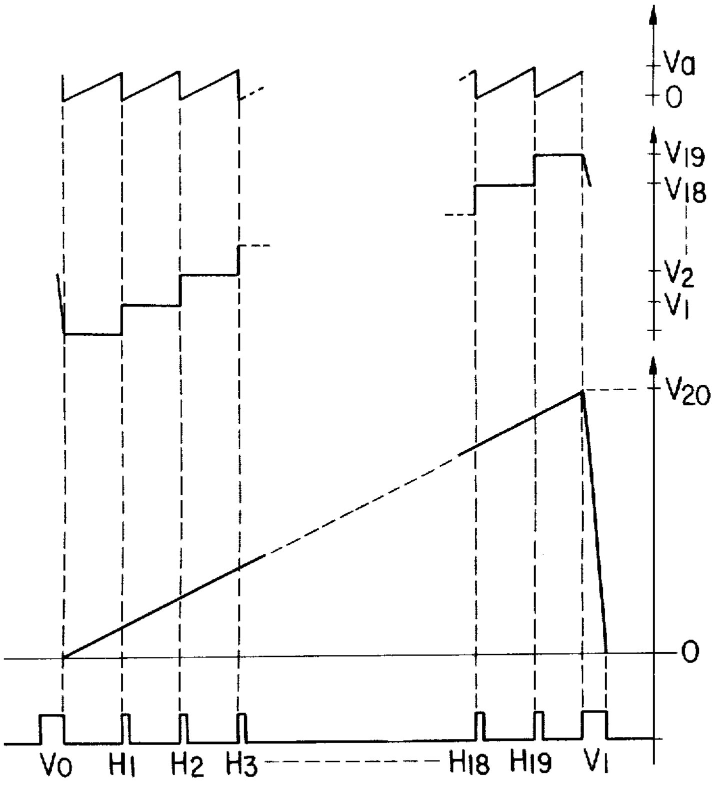
FIG. 4 shows waveforms for the description of the partial block diagrams shown in FIG. 3.
Figure 7:
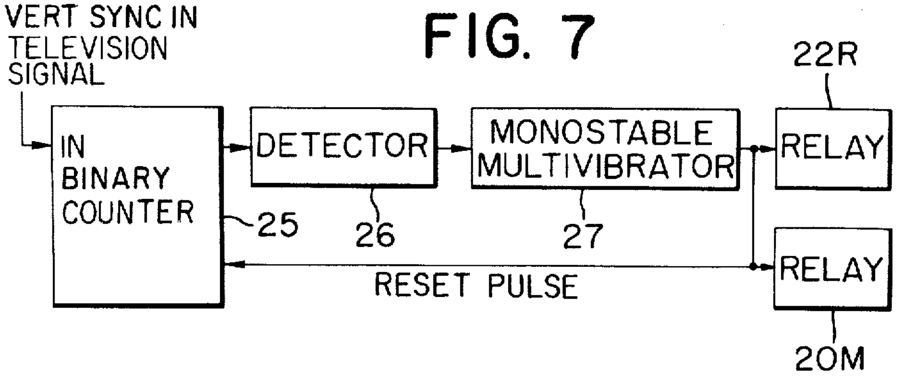
FIG. 7 shows a block diagram to be used in the apparatus of FIG. 1.
Figure 8:
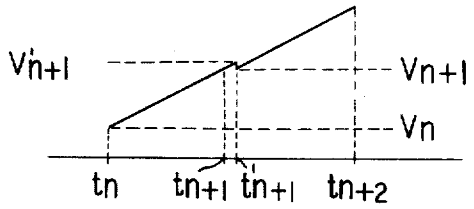
FIG. 8 shows waveforms for the diagram of FIG. 7.

For the generation of such a low speed, saw-tooth shape voltage, a variable resistor may be used having a rotating contact point. This is shown in FIG. 5. As the contact point is rotated in the direction of the arrow X, the voltage at the point $P_1$ increases, and reaches +B at the time of completion of scanning, e.g. 4.375 seconds later. When the contact passes from point S to the initial point E, the switch 22 is left open. To deflection coil 24 is applied a saw-tooth shaped current shown in FIG. 6, through the vertical output circuit 23. Another simple method, as shown in FIG. 7, is counting the vertical synchronous signals of the television receiver up to 256. Then the top 9th unit of the binary counter is 1. This is sensed by the detector 26, which drives monostable multivibrator 27, and a pulse is generated. The counter 25 is reset by the pulse, the relay is opened and the contact 20*a* of the variable resistor is brought into contact with the terminal E, while controlling the motor. If it is desired to detect the 256th line before the voltage reaches +B so that simultaneously with release of switch 22, the contact 20*a* is returned from the point S to the terminal E by means of the motor 11. Though there is some downward over scanning, it can be neglected for practical purposes. The wow and flutter must be eliminated when the video signal recorded on the magnetic tape as described above is stored in storage tube, which is described below. In FIG. 4, waveform C is produced by adding waves A and B. In the FIGS. 4-B $V_1, V_2, \ldots$ and $V_{19}$ are in digital form and $V_2 - V_1, V_3 - V_2, \ldots V_{19} - V_{18}$ are so selected so that they are equal in value. The wave forms shown in FIG. 4-A are obtained by charging and discharging the condenser by triggering a silicon control switch by pulses $H_1, H_2, \ldots$ In this case, the wow and flutter of the tape causes $t_0 - t_1$, $t_1 - t_2$, etc which are not equal in length. Therefore, if there is a wow and flutter of 1 percent, $V_a$ also varies 1 percent. When $V_a$ is 1 volt and $V_2 - V_1 \ldots V_{19} - V_{18}$ are each 1 volt, the value of the composite C voltage $V_{20}'$ is 20 volts. However, if there is a wow and flutter, $V_a$ only will be 1 ± 0.01 volts. The magnified composite wave form will be as shown in FIG. 8, in which, for example, pulse spacing time from $t_n$ to the next pulse is lengthened, say 1 percent; the next pulse will be at $t_{n+1}'$ and $V_a$ comes back to zero, then $V_a$ increases during $t_{n+1}$ and $t_{n+1}'$ and becomes $V_a'$. That is $V_{n+1} + V_a' = V_{n+1}'$; the saw tooth wave becomes discontinuous as shown in the FIG. at $t_{n+1}'$. This voltage is less than 1 percent of $V_a$. When an image is reproduced on the cathode ray tube of 12 inch size, as clearly seen in FIG. 4, the time length between $t_n$ and $t_{n+1}$ corresponds to 24/20 = 0.012 mm because the time axis is divided into 20 equal parts. There is then an horizontal overlapping of 1 percent of 1.2 cm or 0.12 mm. This may not be significant. If horizontally deflected without dividing into parts as described and there is 1 percent of wow and flutter, the length of the scanning line varies ± 2.4 mm to the right or left. This is not practical. However, as in this invention, if divided into divisions, starting $V_a$ from zero, and stabilizing the voltage at each step, the wow and flutter can be reduced to 1/n, where *n* is the number of divisions. The same principle can be applied to vertical scanning. In this case, the horizontal scanning lines move vertically, but 13 lines are clocked, even if the lines move 1 percent vertically, the distance between them is 1/13 = 7.7 percent and they do not overlap.

Now one form of stairway like wave generation will be explained with reference to the block diagram of FIG. 9. Numerals 28, 32 and 36 indicate switches; numerals 29, 33 and 37 indicate flip-flop; numerals 30, 34 and 38 indicate transistors; numerals 31, 35 and 40 indicate resistors. As the terminal Q of flip-flop is connected, when all flip-flops are reset, the base of transistors 30, 34, 38 are at a low level so that all transistors are in the nonconductive state; and the voltage at the point P2 is about +B. When one pulse is applied to the switch 28, the flip-flop 29 is set. If the switch is arranged, as shown in FIG. 10, a narrow pulse is differentiated by capacitor 41 and resistor 44 and is applied to the set terminal of the flip-flop 29 from the collector of a transistor 42. The transistor 42 is then in a nonconductive state as the Q terminal is at a low level. Since the Q terminal of the flip-flop 29 is connected to the base of a transistor 45, the base of the transistor 45 becomes high level when the flip-flop 29 is set, and the transistor 45 conducts. Therefore, the pulses including the second and thereafter will appear on the collector of the transistor 45, and will be applied to the next switch 32. Since the Q terminal of the flip-flop 29 is now at a high level, the voltage at the point $P_2$ is lowered that amount. When next pulse comes in, the flip-flop 33 is set through the switches 28 and 29; the transistor 34 conducts and the voltage at the point $P_2$ is the lowest in value. The fourth pulse is the output from the latter stage of the switch 36; that is, the collector of the transistor corresponding to the 45 of the FIG. 4 and resets simultaneously flip-flops 37, 33, and 29, and the voltage at the point $P_2$ returns to its initial value. In other words, the fourth stairway like voltage is generated at the point $P_2$. From this, it is clear that the *n*th stairway-like voltage is obtained by (*n*-1) number of switches, *n* number of flip-flops, *n* number of resistors, and (*n*-1) number of switching transistors. When this voltage is inverted, the voltage shown in FIG. 4-B may be obtained. Also in the vertical direction, a sweeping voltage may be obtained from the combination of flip-flops and switches not using a variable resistor as shown in FIG. 5. In such a case, the input pulse for the FIG. 10 may be the narrow pulses synchronized with the vertical synchronizing signal in the picture signal.

Figure 9:
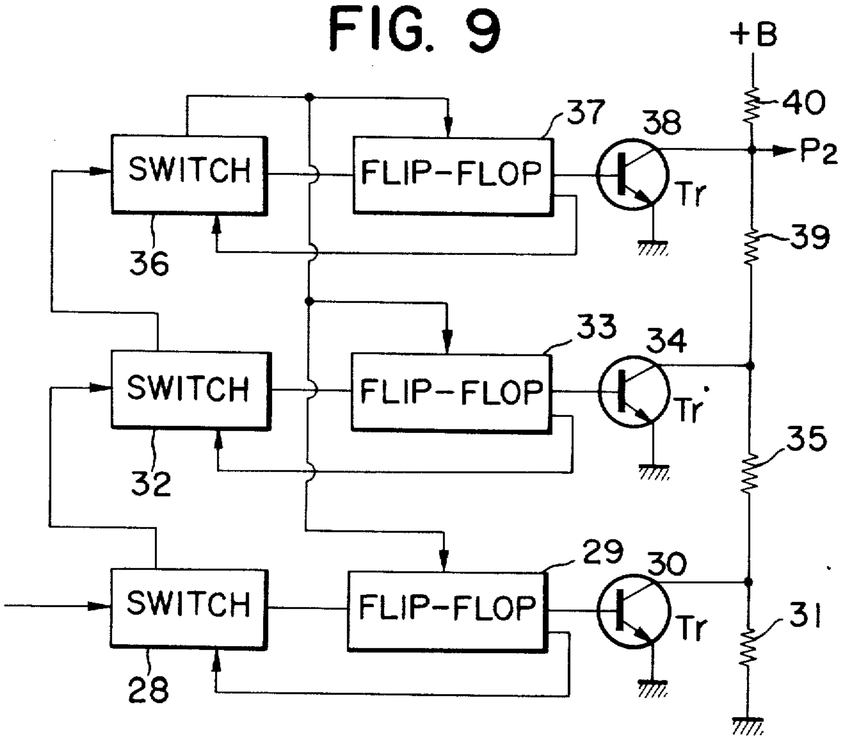
FIG. 9 shows a circuit to be used in the apparatus shown in FIG. 1.
Figure 10:
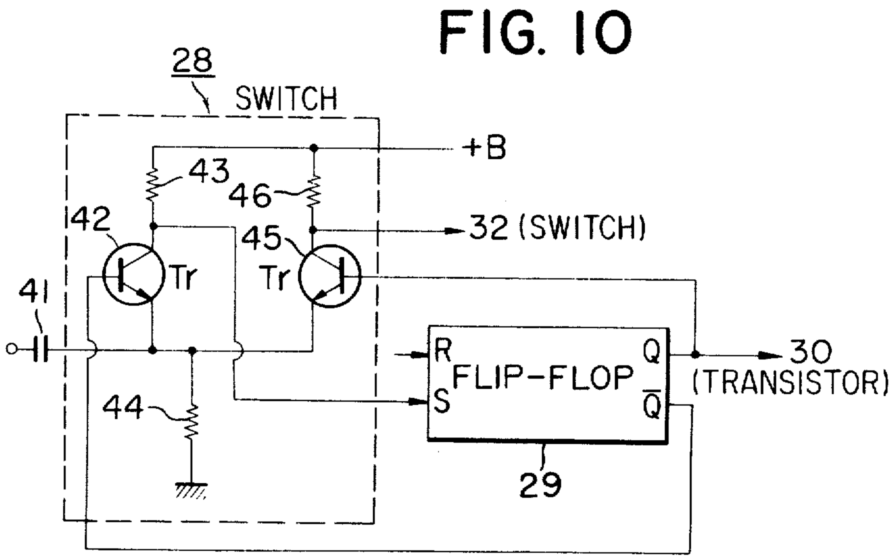
FIG. 10 shows a partial circuit to be used in FIG. 8.

It is needless to say that the circuit shown in the FIG. 9 is suitable for a large scale integration system.

By the method described above, the picture signal stored in a storage tube may be recorded, reproduced and restored in the storage tube by using a recording device having a low frequency band.

The reproduction of picture signal and sound signal in low frequency recorded on the tape or record is described hereinafter.

Figure 12:
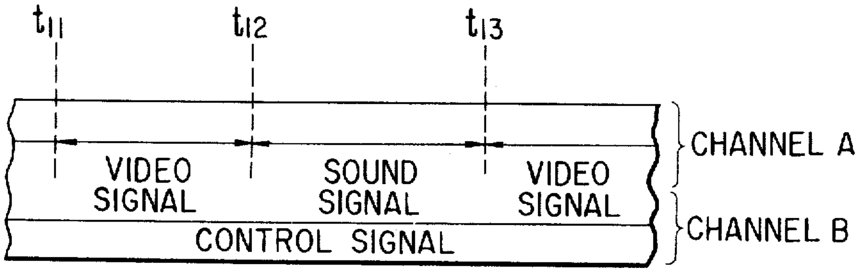
FIG. 12 shows a plan view of a recording tape to be used with the apparatus, showing recorded signals.
Figure 11:
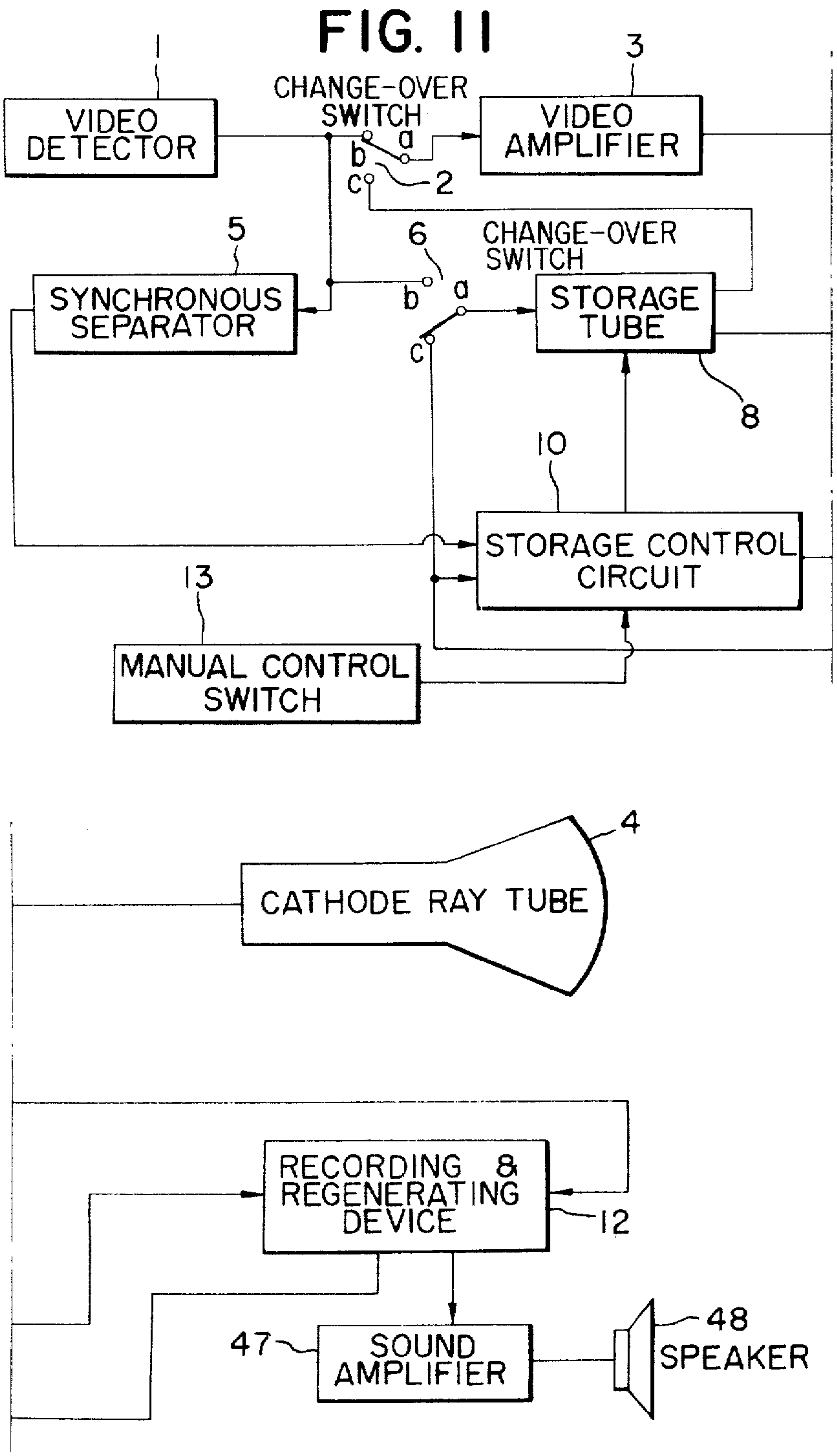
FIG. 11 shows another recording and reproducing apparatus for video and sound signals according to the present invention.

In FIG. 11, the same numerals as in FIG. 1 are identical with those used in FIG. 1. However, the tube 8 in FIG. 11 includes circuits 7 and 9 in FIG. 1, and circuit 12 includes circuit 10. Numeral 47 indicates a sound amplifier and numeral 48 indicates a speaker. Suppose the signal shown in the FIG. 12 is recorded on magnetic tape, from time $t_{11}$ to $t_{12}$, the video signal is converted into low frequency and is recorded. Now this signal is read out and is recorded in the storage tube 8. The deflection system of the storage control is controlled, as described before, by the control signal of Channel B. During the period of $t_{11}$ to $t_{12}$ one frame or one field of picture is stored in the storage tube 8, from time $t_{12}$ the former picture signal is read out, and the static picture is cast on the cathode ray tube 4. In channel B, a switching signal is inserted at time $t_{12}$. The terminals *a* and *c* of the switch 2 are closed automatically and the amplifier 47 is operated simultaneously. During the periods $t_{12}$ to $t_{13}$, the sound information on the static picture recorded during periods $t_{11}$ to $t_{12}$ is reproduced. That is, a static picture is displayed on the cathode ray tube 4 and the description of the picture can be given in a voice frequency from the speaker simultaneously. By control signal from channel B at time $t_{13}$, the terminals *a* and *b* of the switch 2 are closed, the signal in the storage tube 8s is erased and is ready to be written in. From time $t_{13}$, a second frame or field of picture can be displayed by the same procedure as stated before. The procedure is then repeated. When a static picture and sound signal are simultaneously received with the television wave, it is possible to store the static picture in the storage tube and then to record on magnetic tape, at the same time the sound signal is recorded by a tape recorder, and later a tape can be made as shown in FIG. 12.

Figure 14:
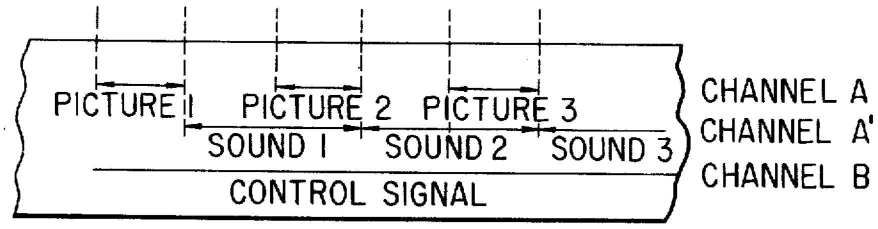
FIG. 14 shows a plan view of a recording tape showing recorded signals, to be used in FIG. 13.
Figures 13, 13B:
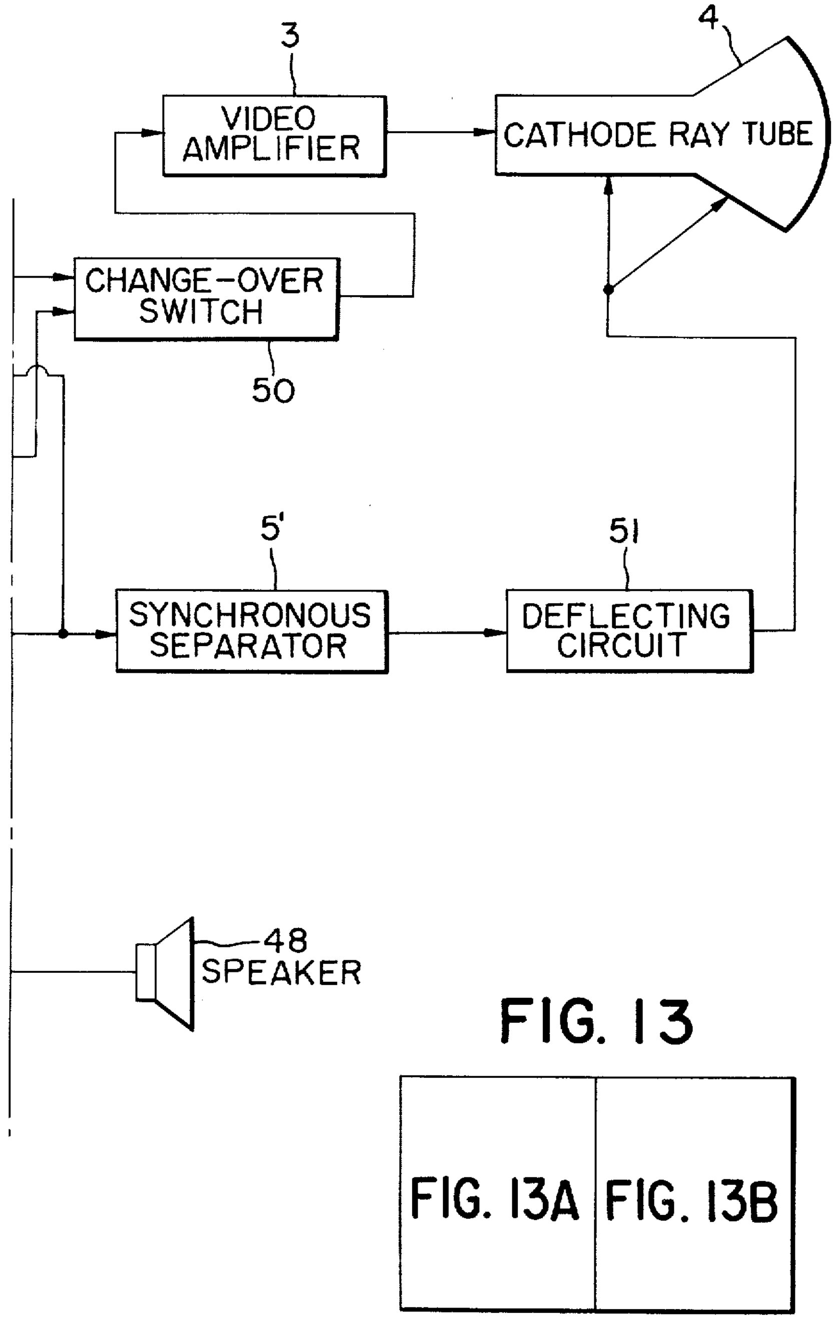
FIG. 13, including
FIGS. 13A and 13B shows a circuit diagram of still another apparatus according to the present invention.
Figure 13A:
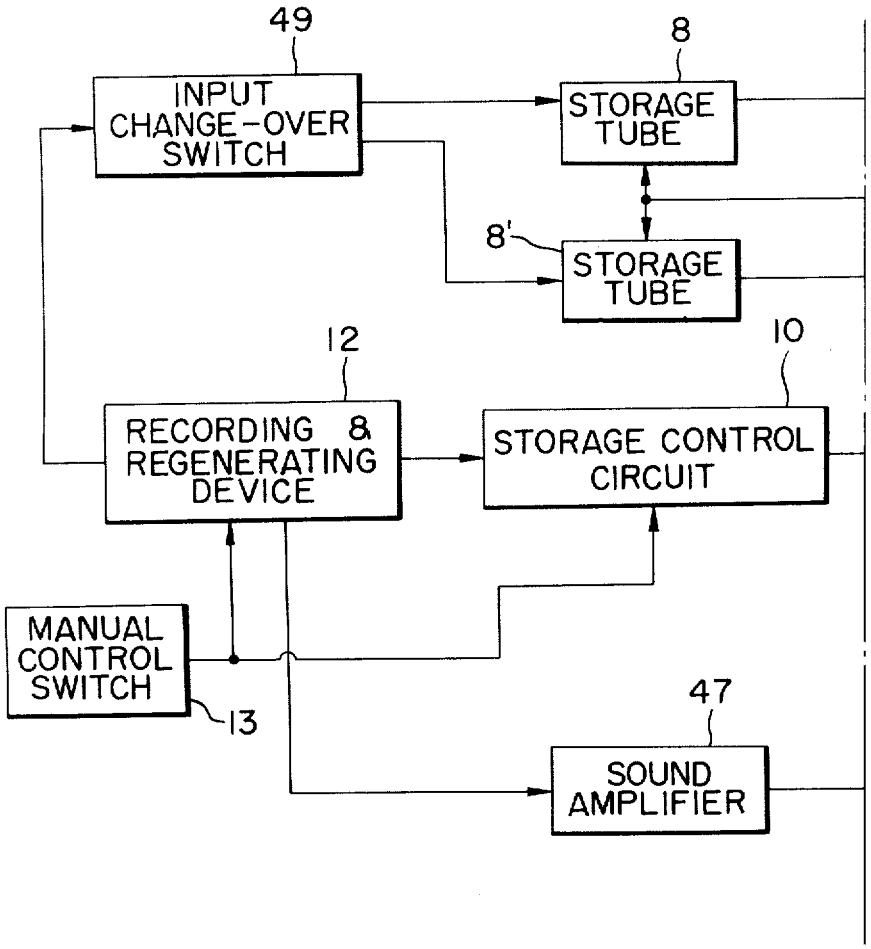
Figure 15A:
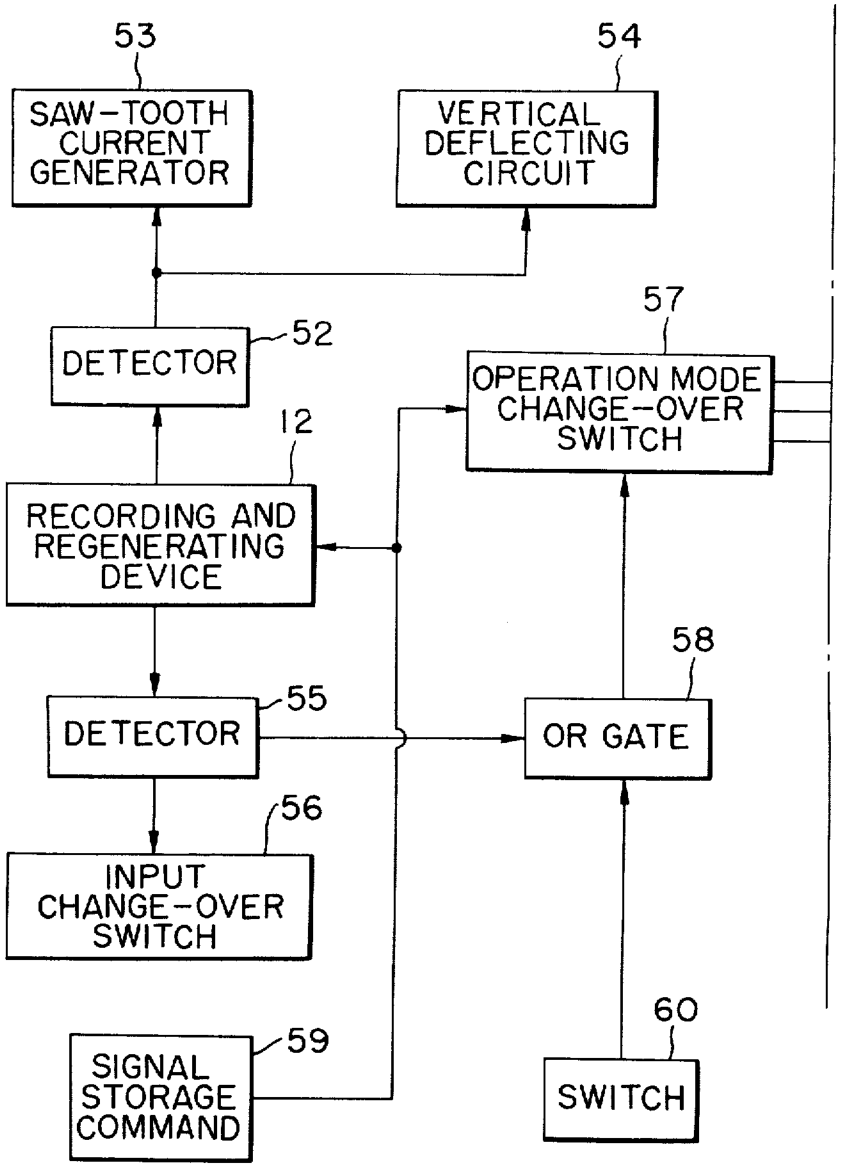
FIGS. 15A and 15B shows a block diagram of the apparatus to be used in FIG. 13.
Figure 15:
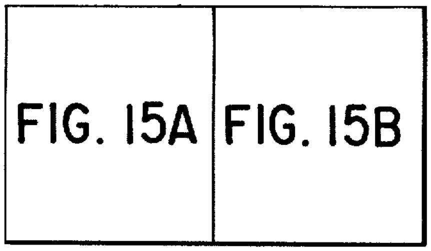
FIG. 15, including
Figure 15B:
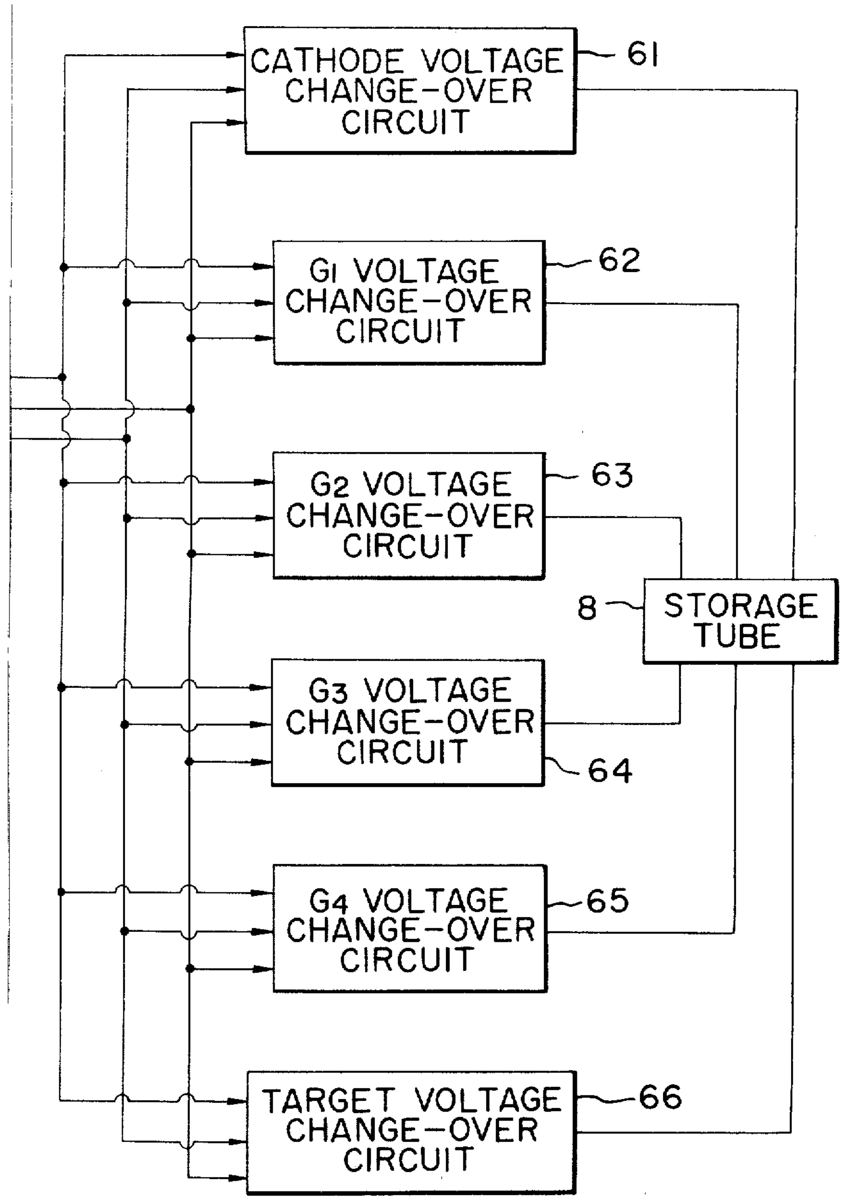
Figure 16:
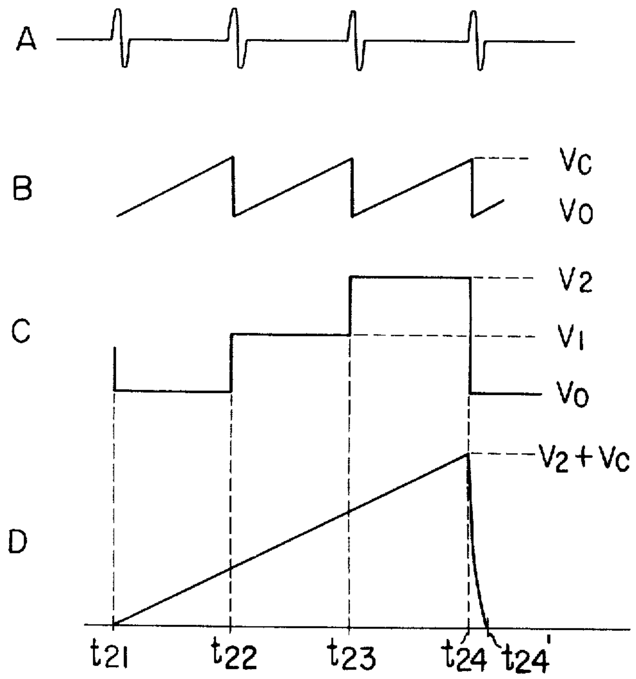
FIG. 16 and FIG. 17 show the waveforms for the description of FIG. 15.

Referring to the FIG. 13 and thereafter, the description of period in which no video signal is obtained by the above method shall be given. By means of control switch 13, the storage tube 8 is set to be ready to record in an incoming signal. The record regenerator 12 is driven to read out the recorded picture and signal simultaneously. As shown in FIG. 14, the information is recorded in three channels on tape. The channel B is like that shown in the FIG. 12 and records control signal: video signal on channel A and the sound signal on Channel A′. For this reason, three heads of tape recorder are required as the record regenerating device. The picture is recorded in the period of $t_{10}$ to $t_{11}$ on channel A and the corresponding sound on channel A′ in the period of $t_{11}$ to $t_{13}$ as sound 1. Further, picture 2 is recorded on channel A during period $t_{12}$ to $t_{13}$ and sound 2 in period $t_{13}$ to $t_{15}$. The picture 2 is stored in the storage tube 8 and during the period the sound for the picture displayed on the storage tube 4 is broadcasted through the speaker 48. That is, at time $t_{11}$ and thereafter, the picture stored in the storage tube 8 is displayed on the cathode ray tube 4 and the sound corresponding to the picture up to $t_{13}$ is read out from the channel A′ and reproduced through speaker 48. Picture 2 is stored in the storage tube 8′ in the period $t_{12}$ to $t_{13}$. At time $t_{13}$, both picture and sound are "2", and so forth. The horizontal deflection signal read out from magnetic tape is seen as FIG. 16-A. At the time $t_{21}$, $t_{22}$, $t_{23}$ and $t_{24}$ clock pulses are applied respectively. The clock pulse is detected by circuit 52 of FIG. 15 and clocks saw-tooth current generator 53. The output of the saw-tooth current generator circuit 53 is like that shown in FIG. 16-B. At the same time, the stairway like voltage shown in C is also produced. This has already been described. The combination of wave B and C is wave D. It is also the same when it has "n" steps. If the repetition of horizontal deflection is 60 Hz, the period $t_{21}$ to $t_{24}'$ is to be taken as 1/60 of second. The division of the period is also stated in this specification. As to vertical deflection the same process is applicable. When the video signal of the period $t_{10}$ to $t_{11}$ is applied to the detector 55, and when for instance, the switch 49 is so closed that the output from the recorder and regenerator 12 is applied to the storage tube 8, the video signal is stored on the storage tube 8. When the storage is over, detector 55 detects control signal; the change over switch 50 is set, the output of the storage tube 8 is applied to video amplifier 3, and all the voltage of the storage tube 8 is changed to the read out state. During the read out period the horizontal and vertical deflection will be the usual television receiver scanning (Horizontal scanning is at 15.75 Hz, and vertical scanning is in 60 Hz). In FIG. 15, numeral 61 indicates the cathode voltage change-over circuit for storage tube; numerals 62 through 66 indicate $G_1$-voltage change-over circuit, $G_2$-voltage change-over circuit, $G_3$-voltage change-over circuit, $G_4$-voltage change-over circuit, and target-voltage change-over circuit, respectively. Numeral 57 indicates the operation mode change-over circuit for storage tube 8; numeral 56 indicates the input change-over circuit for storage tube 8, corresponding to 49 of the FIG. 13. Numerals 59 and 60 indicate switches constituting the portion of control switch 13. Numeral 59 indicates signal storate commanding switch which displays the static picture of cathode ray tube 4 after storage. Numeral 60 indicates the erase commanding switch for storage tube 8. Numeral 58 indicates the OR gate which transmits outputs of detector 55, of signal storage commending switch 59, and of erase commanding switch 60 to change over circuit 57.

From time $t_{11}$, picture 1 is displayed on the cathode ray tube 4 and sound 1 is reproduced from the speaker 48.

Next the change-over method of picture and sound at time $t_{13}$ is described.

Figure 17:
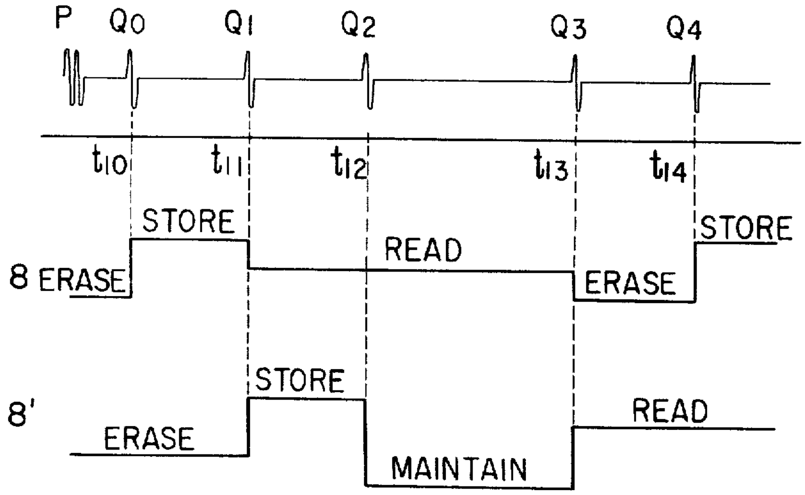
Figures 18, 18A:
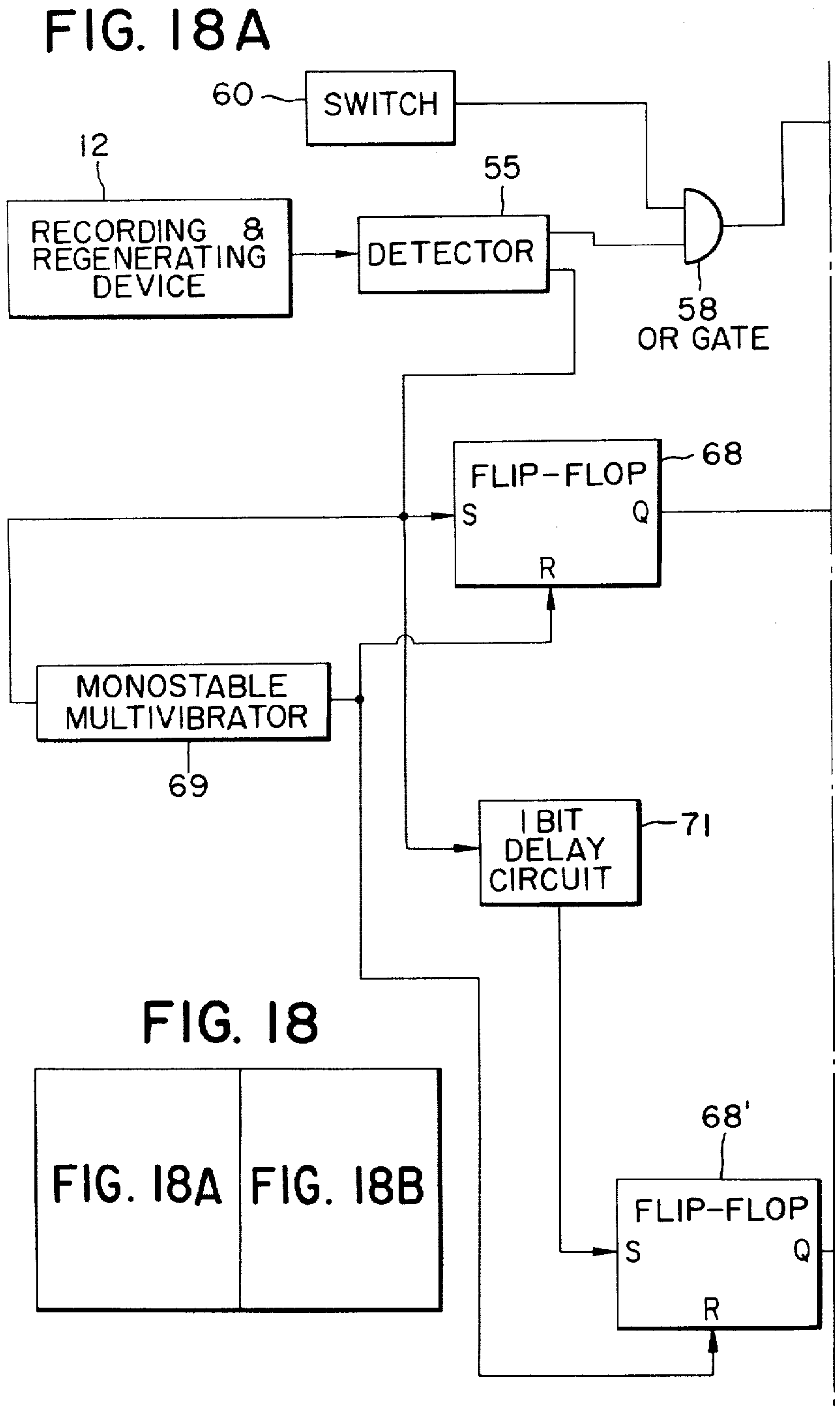
FIG. 18 including
FIGS. 18A and 18B shows a block diagram showing a detailed embodiment of the apparatus shown in FIG. 15.
Figure 18B:
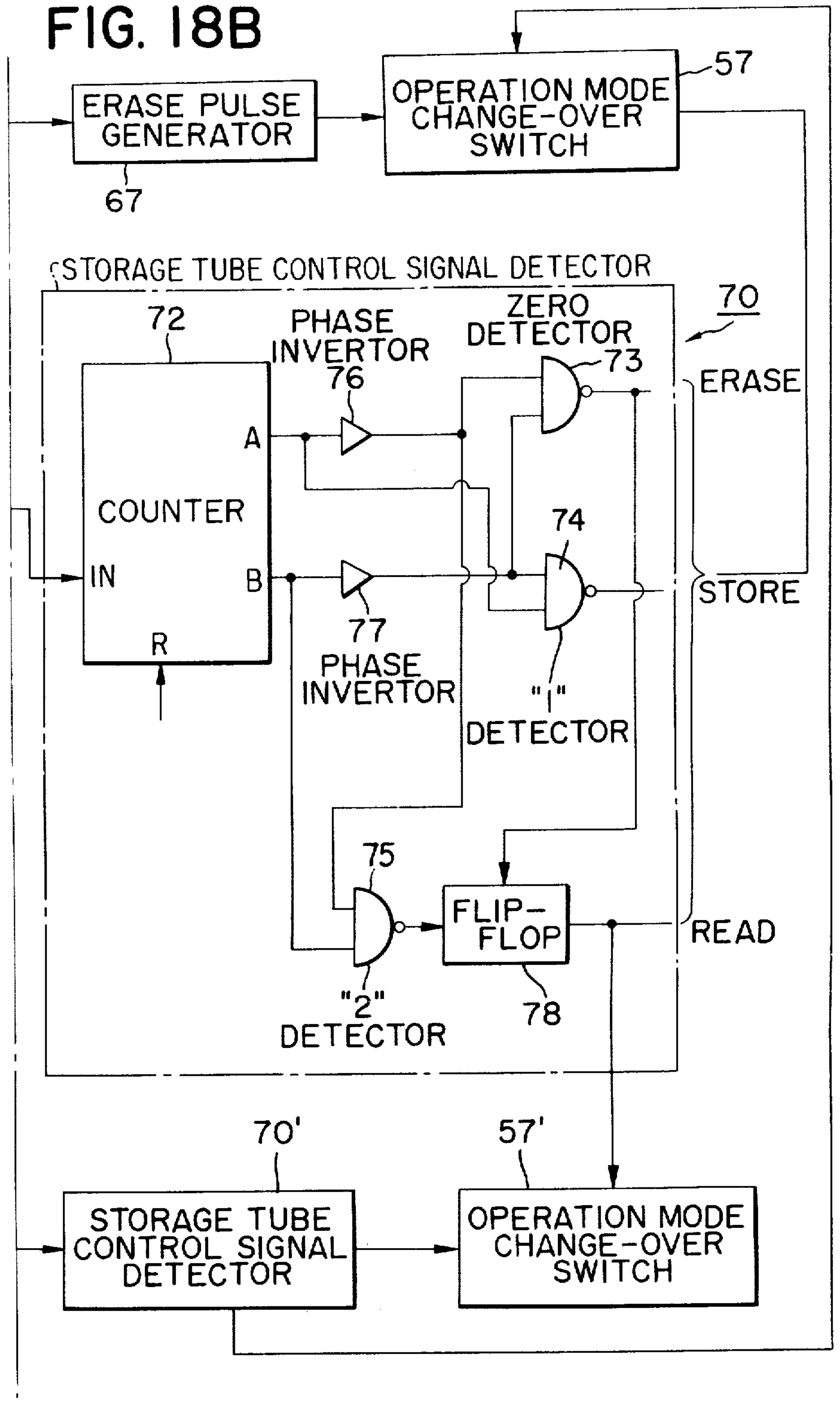

The manually operating storage commanding switch and reading out signal from magnetic tape, erase signal P is generated as shown in FIG. 17 by the storage commanding switch 59. The storage mode change over circuit is controlled by the signal. Each electrode voltage of the storage tube 8 is brought to erasing state voltage and at the same time, the state of a storage tube 8' is also brought to the same state with that of 8 by controlling a change-over circuit 57' which is identical with that of the change over circuit 57. The signal $Q_0$ read out from the tape detected by the detector 55 and is shaped as a pulse and applied to flip-flop 68 shown in FIG. 18, to 1 bit delay circuit 71, and to monostable multivibrator 69. When flip-flop 68 is set, a high level output from Q terminal is applied to counter 72. The monostable multivibrator 69 produces output at $\Delta t$ after $t_{10}$ of FIG. 17, the output resets flip-flop 68. That is, the pulse width of the output from flip-flop 68 is $\Delta t$. By resetting counter 72 by P signal, the two unit output terminals A and B are zero before time $t_{10}$. This is because two imputs of zero detecting circuit 73 are high level because of the phase inverter 76, 77, and as the result of it the output of zero detecting circuit becomes low level. Then the erase signal is generated. The pulse is applied to the counter 72 at the time $t_{10}$ the output A becomes 1 and B, 0; the output "1" of detector 74 becomes low level. The storage signal is generated at this time. The input of the flip-flop 68' is zero at the time $t_{10}$. The output of the flip-flop 68' will remain low level till $t_{11}$ because it is reset at $t_{10} + \Delta t$. The storage tube control signal detector circuit has the same construction as that of 70. When a pulse is generated from detector 55 at $t_{11}$ by the next pulse, the flip-flop 68 is set; $\Delta t$ later it is reset, and an output from counter 72 becomes 0 and B output becomes 1; two inputs of "2"-detector circuit 75 both become high level and the output of detector 75 becomes low level. The flip-flop 78 is set by this signal and the storage tube 8 becomes the state of reading out. At the time $t_{11}$, $Q_0$ pulse which is delayed 1 bit is applied to flip-flop 68' and reset pulse which is delayed by Δt after the time $t_{11}$ resets the flip-flops 68 and 68' simultaneously. Designing the storage control signal detecting circuit 76' as that of 76, the storage tube 8' becomes the state of storage at the time $t_{11}$. At the time $t_{12}$ both outputs A and B of the counter 72 become high level but the flip-flop will not be reset. On the other hand, the outputs of the counter 72 constituting storage control signal detector circuit are "0" at this moment at a terminal and "1" at B terminal, and the output of detecting circuit 75' is low level and the tube 8' becomes the state of reading out. However, when the storage tube 8 is in the state or reading out, that is the output of flip-flop 78 is at high level, the electron beam of storage tube 8' should be in a cutoff state so that the stored information will be kept for a longer time. The FIG. 17 shows this. At the time $t_{13}$, the output of counter 72 are both A and B are "0", and the storage tube 8 is in the state of erase. On the other hand, when the output of counter 72' is "0", the B is "1"; consequently, the output will be low level, flip-flop 78' will then be set and the state becomes read out. Continuing, while the flip-flop 78' is set, it is needless to say that it will become the state of holding even when the storage tube becomes the state of read out. The change over switch 50 applies the output of the storage tube which is under the state of read out to the video amplifier 3. This may be accomplished by gating by the output of flip-flop 78 which constitutes the storage control signal detector circuit 70. As to the input change over switch 56 of the storage tube constituting 49 of the FIG. 13, the application of the output of signal regenerator device to the storage tube which is under storage state may be easily done by using the output of the storage tube control signal detector circuit 70. The horizontal and vertical deflections of the storage tubes 8, 8', when they are used as read out devices, scan at the frequencies of 15.75 and 60 Hz, respectively. They are the common scanning frequencies of television receivers. The change over of the deflection may also be easily accomplished by using the output of the storage tube control signal detector circuit 70. At the end of the tape, the "p" signal is inserted which is detected by detector 55 and an erase pulse is generated. After time $t_{14}$, the process is a repetition of the process during the time $t_{11}$ to $t_{14}$.

Figures 19, 19A:
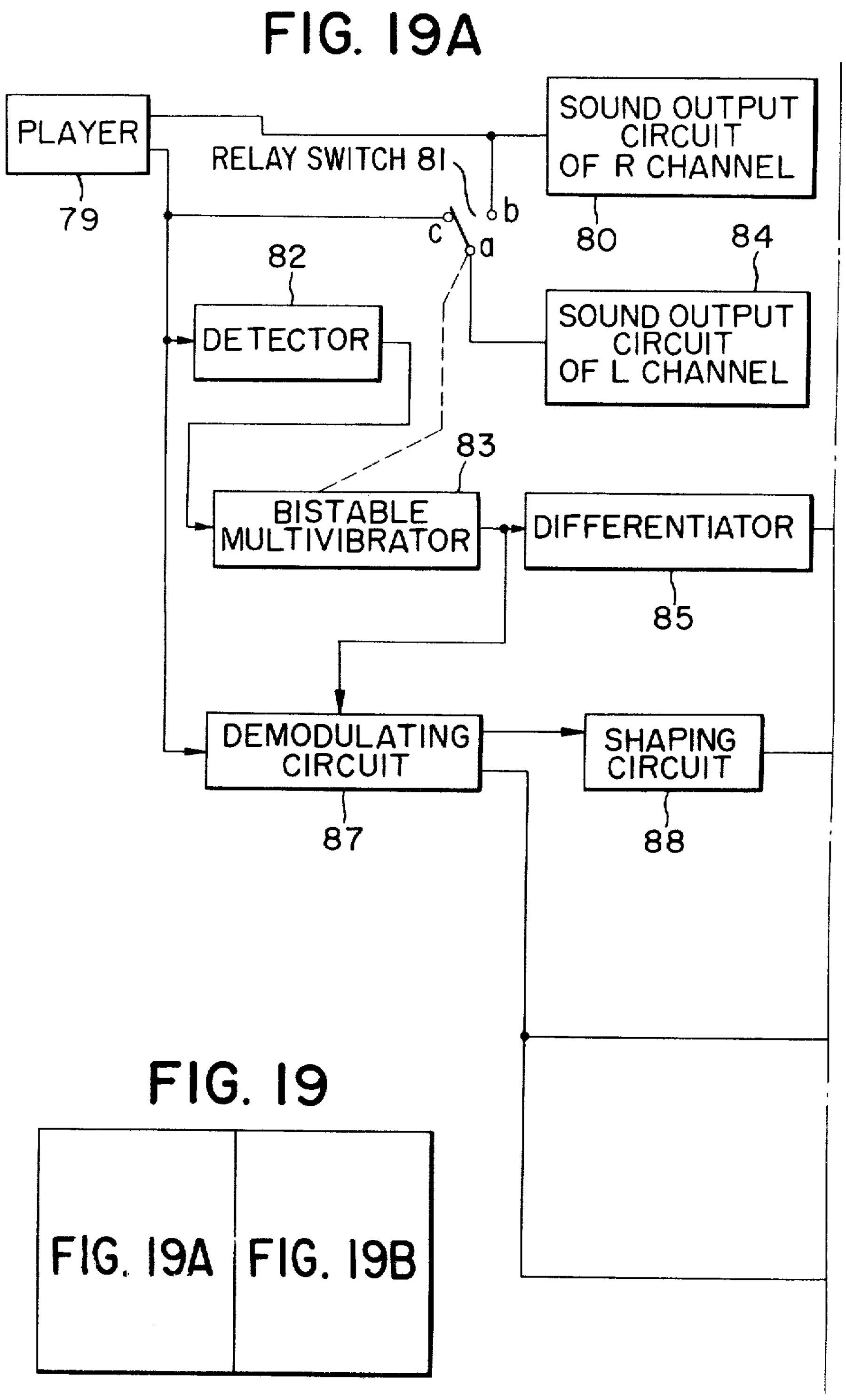
FIG. 19 including
FIGS. 19A and 19B shows a block diagram for still another embodiment of the present invention.
Figure 19B:
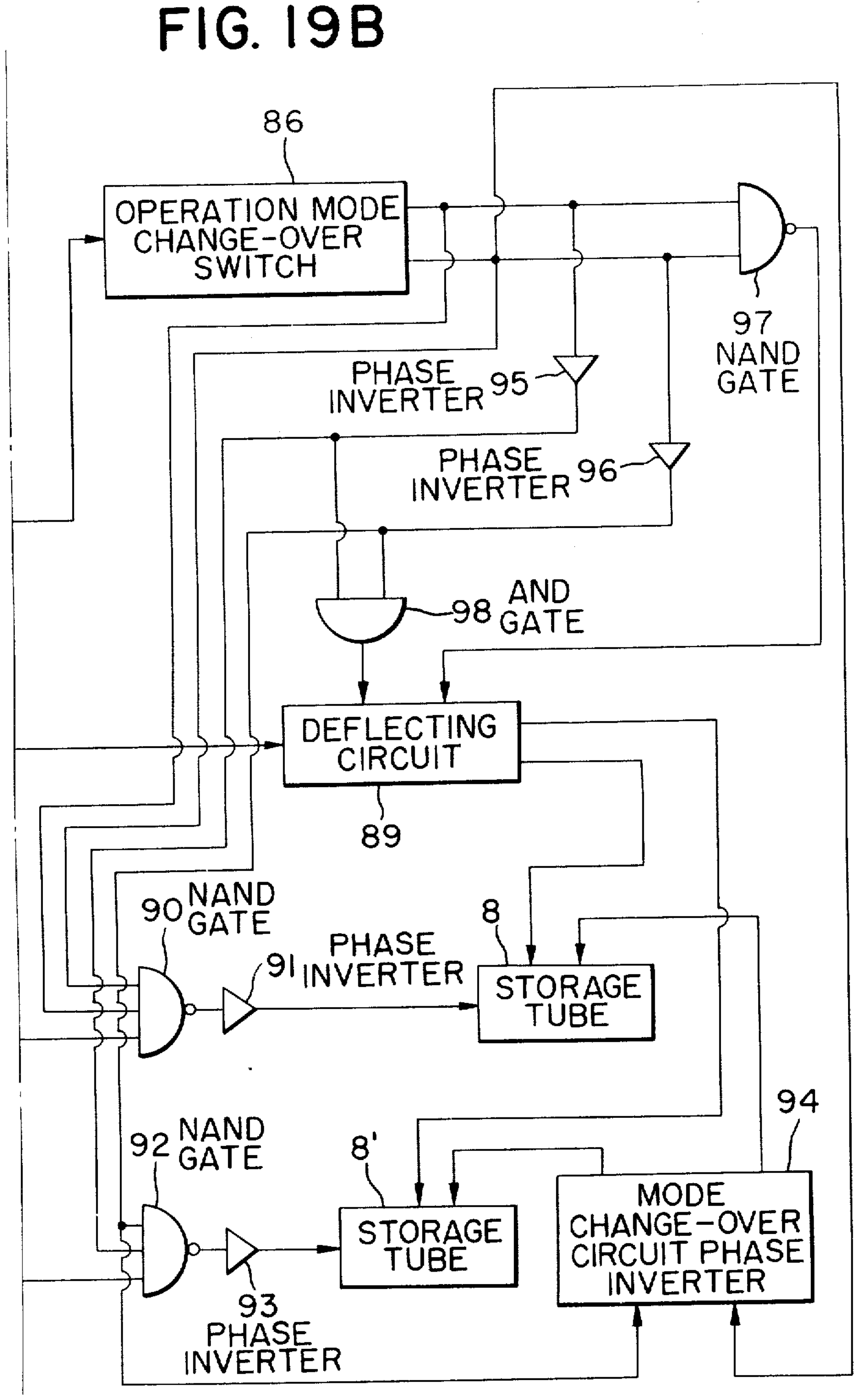
Figure 20:
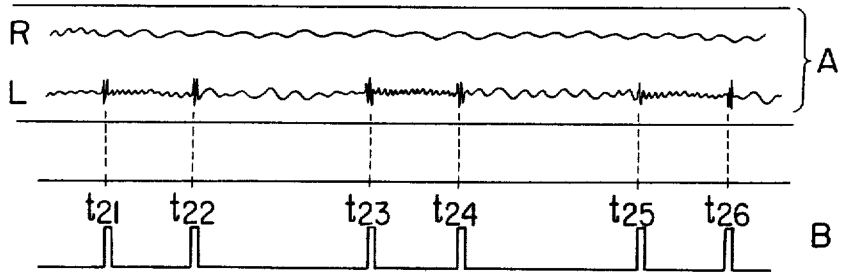
FIGS. 20 and 21 show waveforms for the description of the apparatus shown in FIG. 19.
Figure 21:
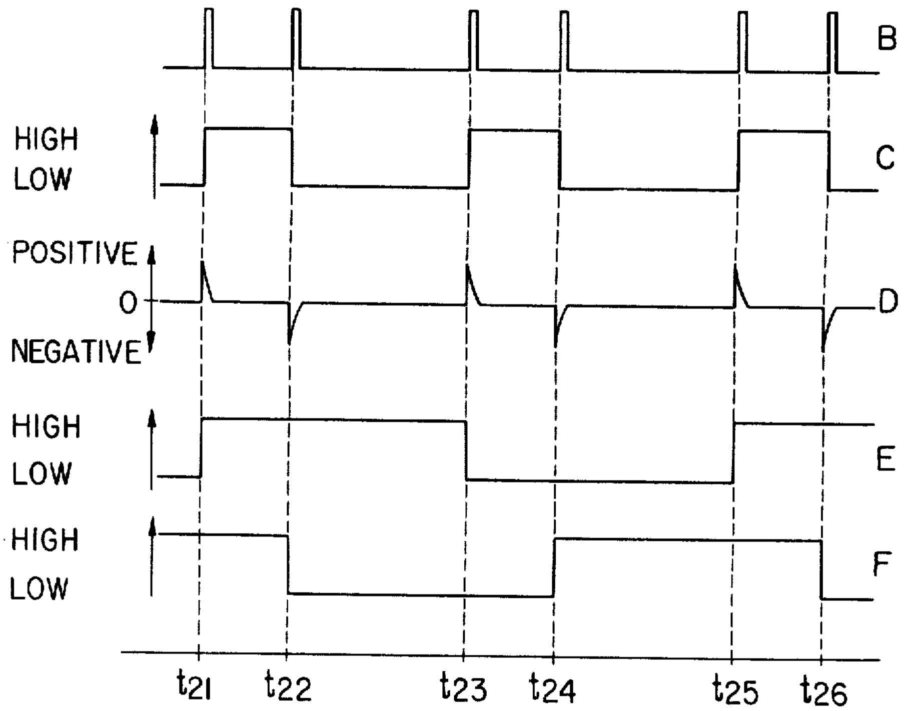
Figure 22:
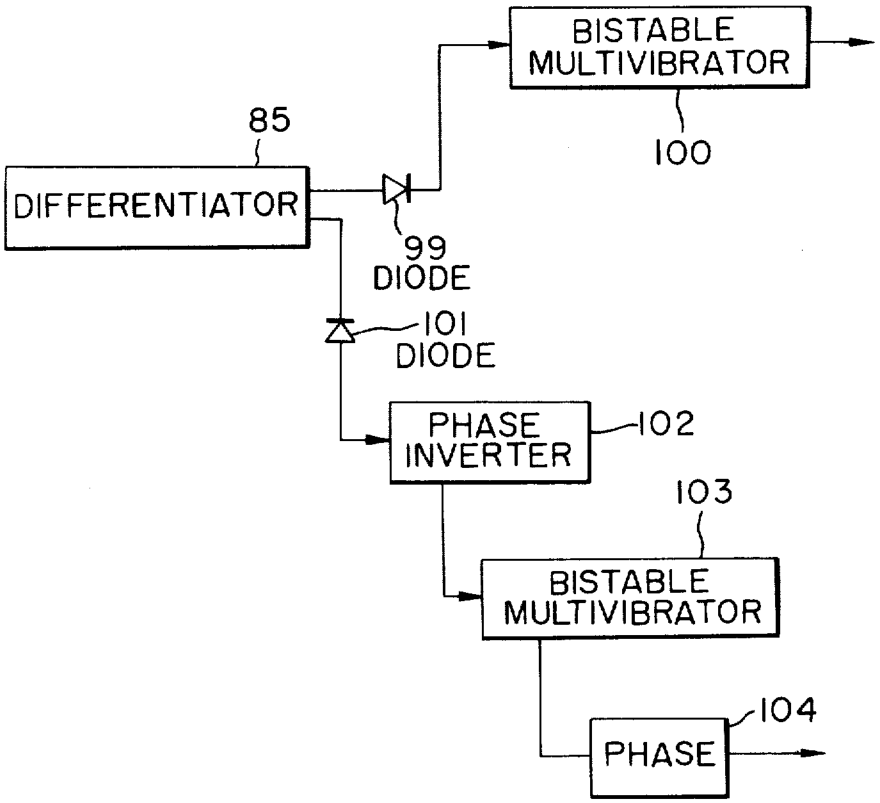
FIG. 22 shows a partial block diagram for the apparatus shown in FIG. 19.

The application of a video signal to a stereo recorder will be described. In FIG. 19, numeral 79 indicates a stereo record player or stereo tape player. Numeral 80 indicates the sound output circuit of right (R) channel. Numeral 81 indicates a relay switch for change over from stereo sound to "monaural" or a single channel sound or vice verse. Numeral 82 indicates a circuit for detecting control signals located before and after the video signal. Numeral 83 indicates a bistable multivibrator to be driven by the output of the control signal detector circuit 82. The output of the bistable multivibrator 83 controls the switching transistor and latter's corrector current drives the relay switch 81. The signal shown by A in the FIG. 20 is assumed to have been recorded on tape. On the R channel is recorded the audio signal of 20 Hz to 20 kHz and on the L channel is also recorded the audio signal except periods between $t_{21}$ to $t_{22}$, $t_{23}$ to $t_{24}$, $t_{25}$ to $t_{26}$, etc. As the output of bistable multivibrator 83 is, as shown by C in FIG. 21, of low level, the switching transistor is cut off and the terminals a and c of switch 8 are short circuited or closed, so that the sound is produced through the L channel. The application of control signal occurs at the time $t_{24}$, the detector circuit 83 detects it, the pulse shown by B in FIGS. 20 and 21 is applied to the bistable multivibrator 83 and the output of the bistable multivibrator 83 becomes high level as shown by C in the FIG. 21. As the consequence, the switching transistor conducts, and the terminals *a* and *b* of switch 81 are closed by operation of a relay. From the speaker of sound output circuit 84 is produced the same sound from the speaker of sound circuit 80. The waveform shown by C of FIG. 21 is applied to switch 81, a NAND gate (not shown) constituting switch 81 conducts, the signal in the L channel passes through the video signal demodulation circuit. If a carrier of 31.5 kHz is being transmitted during time $t_{21}$ to $t_{22}$, the demodulated picture signal is separated from the carrier and obtained from the demodulating circuit 87. The picture signal from the demodulating circuit 87 is applied to NAND gates 90 and 92. The carrier is shaped by shaping circuit 88 and the shaped carrier controls the horizontal and vertical deflection currents of storage tubes 8 and 8'. The output of the bistable multivibrator 83 is differentiated by differential circuit 85 and positive and negative driving signals are supplied to circuit 86. As shown in FIG. 22, the circuit 86 consists of two multivibrators and the wave shown by D in FIG. 21 drives bistable multivibrator 100, being formed as positive pulse by diode 99. The output of bistable multivibrator 100 is of the wave form shown by E in FIG. 21. The level is kept high till the next pulse comes at time $t_{23}$. Diode 101 passes only a negative pulse which is inverted by phase inverter 102, which drives bistable multivibrator 103. The output of multivibrator 103 is high level at the time $t_{22}$, but it is inverted by inverter 104 and becomes low level as shown by the wave form in FIG. 21. At period $t_{21}$ to $t_{22}$, both E and F of FIG. 21 are at high level. The NAND gate 90 opens and the output of demodulating circuit 87, being inverted, comes out at the output terminal of NAND gate 90. This is inverted by inverter 91 and stored infirst storage tube 8. That is, during period $t_{21}$ to $t_{22}$ the video signal in the L channel is stored in the storage tube 8. Two inputs to NAND gate 90 are at low level because waves E and F in FIG. 21 being inverted, gate 90 does not conduct. The output of deflection circuit 90 is applied to storage tube 8 during the period when detected waves E and F are both positive. When storage is completed at time $t_{22}$, the storage tube 8 is deflected at the horizontal and vertical repetition rate of a common television receiver. The deflection current is supplied from deflection circuit 89 (deflection circuit of common receiver). The output of the deflection circuit 89 is applied to the deflection yoke of storage tube 8 during the period of $t_{22}$ to $t_{24}$ while wave F in FIG. 21 is at a low level. Each electrode of the storage tube 8 may easily be rendered in a reading out state in the period $t_{22}$ to $t_{24}$, and a storage state in the period of $t_{21}$ to $t_{22}$, when the outputs of NAND gate 97 and of inverter 96 are used. Until waves E and F become positive after time $t_{24}$, the state of erase is to be maintained. When both waves E and F in FIG. 21 become negative at time $t_{23}$, the picture signal in the L channel is transmitted to NAND gate 92 as stated before, the two inputs of the NAND gate 92 invert waves E and F of FIG. 21 by inverters 95 and 96. As both inputs are positive, the output of the demodulation circuit 87 is phase inverted at the output terminal of the NAND gate 92. The NAND gate 90 is closed at time $t_{23}$. The output of NAND gate 92 is inverted by the inverter 93 and stored in the second storage tube 8', after inverted. The output of the deflection circuit 89 is controlled by the output of a gate 98 and transmitted to the storage tube 8'. Till the time $t_{24}$, the stationary picture in the period $t_{21}$ to $t_{22}$ is displayed on the cathode ray tube 4. When another picture is stored on the storage tube 8', the storage tube operation mode change over circuit 94 is controlled by the high level portion of F in FIG. 21; its output is transmitted to the storage tube 8', the storaged information of the storage tube 8' up to time $t_{26}$ is read out and displayed on the cathode ray tube as a stationary picture. After time $t_{25}$, the operations of the period $t_{21}$ to $t_{25}$ are repeated. After change over of the output of storage tubes 8 and 8', the method described can be used. When the video signal is stored in the storage tubes 8 and 8' at low speed, the wow and flutter may be almost eliminated by using a clock pulsing beam deflecting at 21.5 kHz or 1/n of that frequency. The method was described in the specification. The period of video signal may be made at any desired length and; it is of almost no disturbance to the enjoyment of stereo signals.

I claim:

1. Apparatus for receiving video and audio information signals, recording the video and audio signals and reproducing picture images and sound represented by said video and audio signals, comprising:

a broadband storage tube;

recording means having relatively narrow band capability;

means for storing a field of received video information signals in said storage tube at a relatively fast rate;

means for reading out the video information from said storage tube at a relatively slow rate and recording said video information in said recording means;

means for recording received audio information signals in said recording means;

means for reading out the video information in said recording means at a relatively slow rate and restoring said video information in said storage tube;

means for displaying picture images represented by the video information re-stored in said storage tube;

means for reproducing sounds represented by the audio information in said recording means;

said recording means having a plurality of channels; and means for recording control signals including horizontal and vertical synchronizing signals correlated with the scanning rate of the video information on a first of said channels and for simultaneously recording said video information on a second of said channels, said means for reading out and restoring video information comprising means controlling the scanning of said storage tube in response to said horizontal and vertical synchronizing signals when video information in said recording means is restored in said storage tube.

2. An apparatus as defined by claim 1 wherein the audio information is recorded on said second channel between fields of said video information.

3. An apparatus as defined by claim 1 wherein the received audio information is recorded on said second channel between fields of said video information.

4. An apparatus as defined by claim 1 further comprising means for recording the video and audio information on separate channels.

5. An apparatus as defined by claim 1 wherein the audio information is recorded on a third channel in said recording means.

6. An apparatus as defined by claim 1 wherein the audio information is recorded on a third channel in said recording means.

7. Apparatus for receiving video and audio information signals, recording the video and audio signals and reproducing picture images and sound represented by said video and audio signals, comprising:

first and second broadband storage tubes;

recording means having relatively narrow band capabilities;

means for storing a field of received video information signals in said storage tube at a relatively fast rate;

means for reading out the video information from said first storage tube at a relatively slow rate and recording said video information in said recording means;

means for recording received audio information signals in said recording means;

means for reading out the video information in said recording means at a relatively slow rate and alternatively re-storing said video information in said first and second storage tubes;

means for alternately displaying picture images represented by the video information re-stored in said first and second storage tubes, whereby recorded video information can be continuously displayed;

means for reproducing sounds represented by the audio information in said recording means;

said recording means having a plurality of channels; and means for recording control signals including horizontal and vertical synchronizing signals correlated with the scanning rate of the video information on a first of said channels, said means for recording said video information in said recording means comprising means for recording said video information on the second of said channels simultaneously with the recording of said control signals on the first of said channels, said means for reading out and re-storing video information comprising means controlling the scanning of said first and second storage tubes in response to said horizontal and vertical synchronizing signals when video information in said recording means is re-stored in said first and second storage tubes, respectively.

8. An apparatus as defined by claim 7 wherein said recording means has a plurality of channels and further comprising means for recording control signals on a first of said channels and said video information on a second of said channels.

9. An apparatus as defined by claim 8 wherein said control signals are correlated with the scanning rate of the video information on said second channel.

10. An apparatus as defined by claim 9 wherein said means for reading out the video information in said recording means is under control of the control signals on said first channel.

* * * * *